United States Patent
Gillani et al.

(10) Patent No.: US 11,386,041 B1
(45) Date of Patent: Jul. 12, 2022

(54) POLICY TAG MANAGEMENT FOR DATA MIGRATION

(71) Applicant: Amazon Technologies, Inc., Reno, NV (US)

(72) Inventors: Syed Omair Zafar Gillani, Issaquah, WA (US); Carl Wesley Summers, Bainbridge Island, WA (US); Jonathan Jorge Nadal, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 774 days.

(21) Appl. No.: 14/962,746

(22) Filed: Dec. 8, 2015

(51) Int. Cl.
*G06F 16/11* (2019.01)
*G06F 16/176* (2019.01)
*G06F 16/2455* (2019.01)
*G06F 16/2457* (2019.01)

(52) U.S. Cl.
CPC .......... *G06F 16/119* (2019.01); *G06F 16/176* (2019.01); *G06F 16/24564* (2019.01); *G06F 16/24573* (2019.01)

(58) Field of Classification Search
CPC ......... G06F 17/30079; G06F 17/30165; G06F 17/30507; G06F 17/30525; G06F 17/30569
USPC ....................................................... 707/756
See application file for complete search history.

(56) References Cited

U.S. PATENT DOCUMENTS

| | | | |
|---|---|---|---|
| 8,380,696 B1 | 2/2013 | Rogers | |
| 8,849,764 B1* | 9/2014 | Long | G06F 11/1451 707/646 |
| 9,110,756 B1* | 8/2015 | Guo | G06F 8/65 |
| 10,594,730 B1 | 3/2020 | Summers | |
| 2003/0196108 A1 | 10/2003 | Kung | |
| 2007/0162749 A1 | 7/2007 | Lim | |
| 2008/0133486 A1* | 6/2008 | Fitzgerald | G06F 9/5077 |
| 2009/0254585 A1* | 10/2009 | Akers | G06F 17/30306 |
| 2012/0158725 A1* | 6/2012 | Molloy | G06Q 10/087 707/737 |
| 2013/0054613 A1* | 2/2013 | Bishop | G06F 17/30011 707/748 |

(Continued)

OTHER PUBLICATIONS

USPTO Final Office Action dated Feb. 23, 2018 issued in U.S. Appl. No. 14/962,762.

(Continued)

*Primary Examiner* — Hosain T Alam
*Assistant Examiner* — Nicholas E Allen
(74) *Attorney, Agent, or Firm* — Hogan Lovells US LLP

(57) ABSTRACT

Data tags, such as may be used to classify data, can be automatically applied at appropriate times in a resource environment. A customer can provide an auto-tagging configuration file that can be used to determine tags to be applied to specific data objects based upon properties of those objects. The customer can also provide policies that indicate which actions can be performed for those objects based at least in part upon the applied tags. The tags can be automatically applied at any appropriate time, such as upon storage into the environment, upon modification of the auto-tagging configuration, or upon modification or the data object. In some embodiments, an auto-tagging process can also be performed in response to a request for access to the data object in order to ensure that the correct tags are applied before determining the permitted actions.

20 Claims, 11 Drawing Sheets

(56) References Cited

U.S. PATENT DOCUMENTS

| | | | | |
|---|---|---|---|---|
| 2013/0166303 A1* | 6/2013 | Chang | G06F 17/30787 | 704/258 |
| 2013/0218874 A1* | 8/2013 | Liggett | G06F 17/30554 | 707/722 |
| 2013/0246337 A1* | 9/2013 | Ahuja | G06F 17/30737 | 707/601 |
| 2014/0222756 A1* | 8/2014 | Schmidt | G06F 16/86 | 707/610 |
| 2014/0279893 A1* | 9/2014 | Branton | G06F 16/904 | 707/634 |
| 2015/0074536 A1* | 3/2015 | Varadharajan | G06F 17/30233 | 715/734 |
| 2015/0161092 A1* | 6/2015 | Burgmeier | G06F 17/241 | 715/230 |
| 2015/0163206 A1* | 6/2015 | McCarthy | G06F 21/6227 | 713/171 |
| 2015/0186395 A1* | 7/2015 | Yan | G06F 17/30268 | 707/609 |
| 2015/0200958 A1* | 7/2015 | Muppidi | H04L 41/28 | 726/23 |
| 2015/0212895 A1* | 7/2015 | Pawar | G06F 11/1448 | 707/649 |
| 2015/0222646 A1 | 8/2015 | Diehl | | |
| 2015/0242466 A1* | 8/2015 | Alexander | G06F 17/30864 | 707/627 |
| 2015/0244775 A1* | 8/2015 | Vibhor | G06Q 10/06 | 709/203 |
| 2015/0286537 A1* | 10/2015 | Klose | G06F 11/1464 | 707/652 |
| 2015/0301903 A1* | 10/2015 | Mutha | G06F 11/1453 | 707/692 |
| 2017/0091201 A1 | 3/2017 | Chabot | | |

OTHER PUBLICATIONS

USPTO Non-Final Office Action dated Aug. 15, 2018 issued in U.S. Appl. No. 14/962,762.
USPTO Final Office Action dated Jan. 2, 2019 issued in U.S. Appl. No. 14/962,762.
Notice of Allowance issued in U.S. Appl. No. 14/962,762 dated Oct. 3, 2019.
Notice of Allowance issued in U.S. Appl. No. 14/962,762 dated Dec. 3, 2019.

* cited by examiner

POLICY TAG MANAGEMENT FOR DATA MIGRATION

BACKGROUND

Users are increasingly causing data to be stored in resource environments offered by various resource providers, those environments often referred to as part of "the cloud." This has many advantages, as users such as enterprise users are looking to hybrid storage systems that combine their existing on-premises storage solutions with the agility of the cloud in order to meet their dynamic business needs. The user often will have rules and policies regarding how data is stored and managed within the user environment, and a resource provider will often have different rules and policies for data storage and management in their environment. The rules and policies are typically enforced at the on-premises storage devices themselves, and migrating at least some of this data to the cloud adds the complication that conventional approaches do not also allow for migration and enforcement of the accompanying user rules and policies. In many instances the cloud storage environment will not have a mechanism for mapping or translating the user rules or policies to the rules or policies supported in the cloud storage environment.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of access and actions with respect to data stored in various environments. In at least some embodiments, tags can be applied at the data object level, where the tags are each associated with a policy written with respect to access and use of the data, such as who can access the data, where the data can be accessed, and how the data can be utilized. These tags can be tied to a data object throughout its lifetime, even as the data is moved between locations within an environment or between environments (i.e., into the cloud), where the data is transmitted across at least one trust boundary. The tags can be immutable or mutable, where mutable tags are only modifiable by certain trusted and authorized entities.

The data tags in various embodiments can be automatically applied at various times or in response to various triggers or actions. A customer can provide an auto-tagging configuration file that can be used to determine tags to be applied to specific data objects based upon, for example, properties of those objects. The customer can also provide policies that indicate which actions can be performed for those objects based at least in part upon the applied tags. The tags can be automatically applied at any appropriate time, such as upon storage into the environment, upon modification of the auto-tagging configuration, or upon modification or the data object. In some embodiments, an auto-tagging process can also be performed in response to a request for access to the data object in order to ensure that the correct tags are applied before determining the permitted actions. This access can be requested as part of an object lifecycle, scheduled investigation, application state, or other such trigger or source.

Various other such functions can be used as well within the scope of the various embodiments as would be apparent to one of ordinary skill in the art in light of the teachings and suggestions contained herein.

Figure 1:
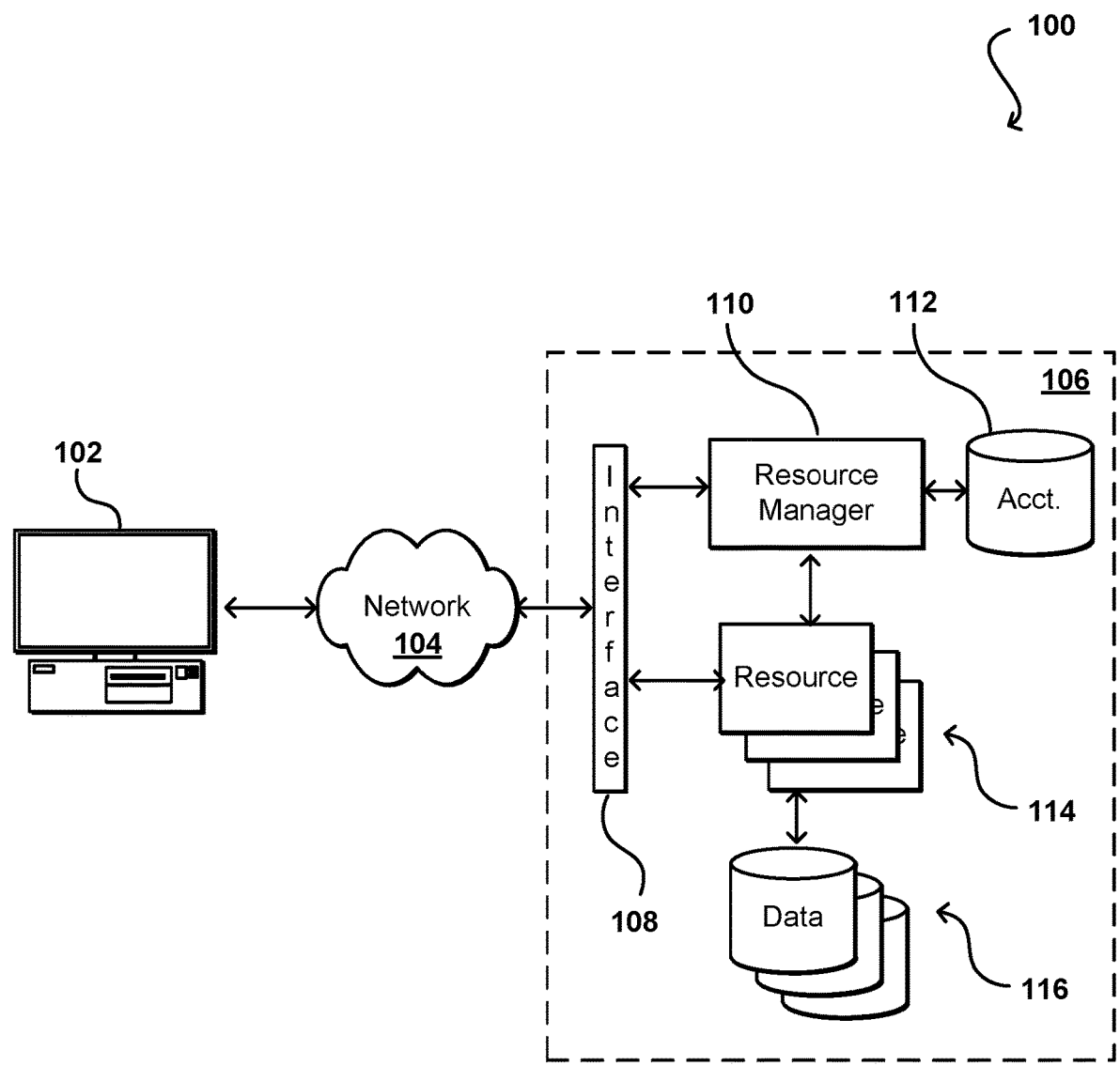
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager, authorization manager 110, or other such system, service, or component configured to manage user accounts and information. A component such as a resource manager can also handle tasks such as resource provisioning and usage, and other such aspects. An authorization manager 110 receiving information for the request can perform tasks such as to authenticate an identity of the user submitting the request, as well as to determine whether that user has an existing account with the resource provider, where the account data may be stored in at least one account data store 112 or other such repository in the provider environment. A user can provide any of various types of credentials in order to authenticate an identity of the user to the provider. These credentials can include, for example, a username and password pair, biometric data, a digital signature, or other such information. The provider can validate this information against information stored for the user in the account data store 112. If the user has an account with the appropriate permissions, status, etc., information can be passed to the resource manager, which can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager, at least until such time as a relevant aspect of the user account changes, the user is no longer granted access to the resource, or another such aspect changes.

The resource manager (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
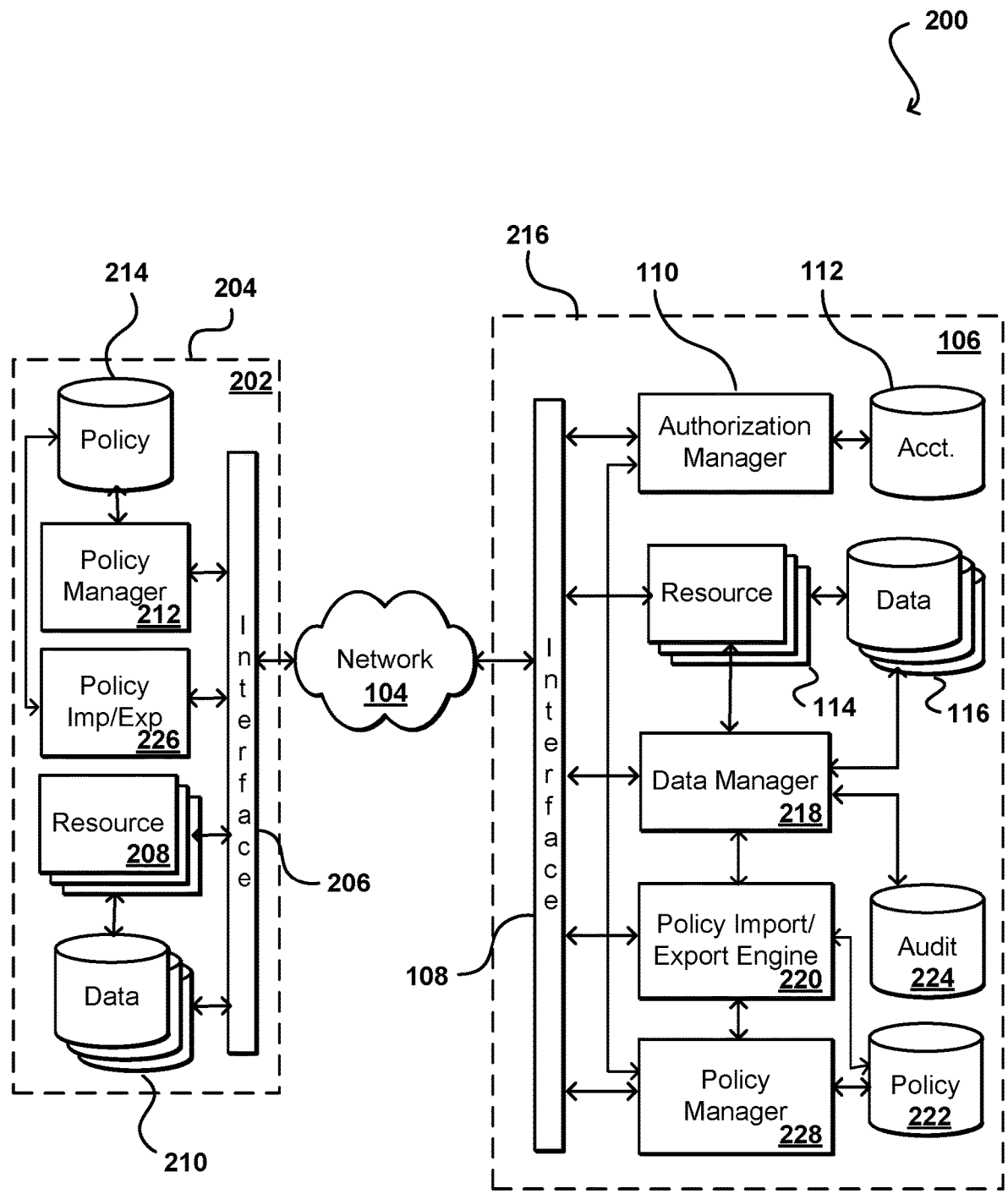
FIG. 2 illustrates an example environment where policy import/export engines can enable the management of policies for data migration between a user environment and a resource provider environment that can be utilized in accordance with various embodiments.

As mentioned, a customer of such a resource environment might have data that is stored within on-premises data storage devices, such as the data stores 210 illustrated in the user environment 202 of the example situation 200 of FIG. 2. The data is stored within a trusted boundary 204 of the customer environment, and can be processed using various resources 208 (e.g., physical or virtual servers) of the user environment 202. The data can be managed using various policies that can be administered by a policy manager 212 and stored in a policy database 214 or other such location. A policy manager in general can refer to a system, service, or component that performs tasks such as creating policies, associating policies with objects, maintaining the associations, providing access to policies, and other such tasks. Users can write policies such as predicate-based policies and lifecycle-based policies, wherein specific actions will be performed for objects with certain tags according to certain predicate-based policies (different policies can apply for different actions) and wherein a determined action will be performed for all objects with a specific tag for lifecycle-based policies.

Requests for access to the data or transmissions including portions of the data can be sent through an interface layer 206, such as those discussed above with respect to FIG. 1. It should be noted that reference numbers may be carried over between figures for similar elements for purposes of simplicity of explanation, but such usage should not be interpreted as a limitation on the scope of the various embodiments unless otherwise specifically stated. The policies used to manage data in the user environment 202 are often enforced at the level of the storage devices themselves. If the user wants at least some of the data in the data stores 210 to be migrated to data stores 116 in the resource provider environment 106, whether for redundancy or alternative storage options, the user will have no way under conventional approaches to migrate the policies with the data. As mentioned, a resource provider environment typically will have no way of mapping the user policies to the policies supported in the resource environment. Further, the resource provider environment may not have any way of ensuring enforcement of the user policies in the resource environment or after export of the data to a third party.

Accordingly, approaches in accordance with various embodiments can enable a user to apply one or more tags to a particular set, group, or collection of data, or a data object or data file, where those tags can be associated with policies and be immutably tied to the particular data that is migrated to the provider environment 106. These tags can be automatically generated by software in the user environment, such as by a policy import/export engine 226 or similar component that can perform tasks such as to monitor the exportation of data, or be contacted in the event of an export, etc., and cause the appropriate tag(s) to be applied. As mentioned, a tag can be an instance of metadata, a property, or another such indicator that can be mutably or immutably tied to a data object. These tags can be tied to a data object throughout its lifetime, even as the data is moved between locations within an environment or between environments (i.e., into the cloud), where the data is transmitted across at least one trust boundary. The tags can be automatically generated or assigned based on predicates (i.e., filename, date, other metadata) that is applied to the files and/or policies during communication to the remote storage system.

A policy import/export engine (or separate import and export engines) can refer generally to one or more systems, services, or components that are configured to perform tasks such as the importing and exporting of policies, as well as determining whether those policies are able to be imported or exported, determining any conflicts, verifying ownership or access to various policies for import/export purposes, and the like. In some embodiments the tags are assigned based upon predicates, such as filename, date, or other metadata, that is applied to the files and/or policies during transmission of the data to the resource provider environment 106. In other embodiments, an envelope can be generated for the transmission of data, where that envelop describes the policy to be associated with the data. The envelope can then be transmitted with the data, such as may "include" or "wrap" the data in the envelope, for receipt and processing by the resource provider environment. As will be discussed subsequently, the tags and/or envelope can then be processed by a component such as a policy import/export engine 220 of the resource environment. The policy import/export engine 220 can determine the "cloud" policies, or policies of the resource provider environment 106, that apply to the bucket or other location for which the user data is to be stored, and if the data and/or user policies violate a policy associated with the bucket then a PUT or similar operation can be denied. In at least some embodiments, the policy import/export engine 220 can work with a policy manager 228, or other such component, system, or service that manages policies on behalf of the resource provider environment 106. In some embodiments the policy manager works with the authorization manager 110 or other such components to determine authorizations of the user in addition to policies to be applied to such usage. This can include, for example, which policies to apply for a specific task to be performed on behalf of a user. In some embodiments, federated identities can be used, as may be provided by various third parties, in order to determine the appropriate authorizations, policies, etc.

The usage of tags with data enables a user to utilize policy-based management capabilities to curate their data as it moves between the customer environment 202 and the resource provider environment 106. The ability to tag data enables the user to be able to track, identify, and/or categorize the data, as well as to understand how that data is being used. A users can then leverage this data classification and tag approach tags to write and/or select polices to be used in managing the data within the customer environment 202, within the resource provider environment 106, and at other locations that might obtain access to the data. Once a policy is applied using these tags, the policy should be automatically enforced in the environment or on the storage platform where the data resides. The ability to categorize data enables data management based on factors such as compliance requirements, information technology (IT) governance, and security policies that apply for a given user (i.e., enterprise). For example, a user can categorize a set of data as "log" data. The user can then manage all data that falls within this category using a specified set of policies. Data categorized in a separate category, such as "financial critical" data, may be subject to a different set of management policies, as may be specified by contract or otherwise. Users today rely on their on-premises storage devices 208, 210 to support policy enforcement and management. As users move their data to resource provider environments 106 (and back), the approaches presented herein can provide a way for the user to ensure the specified data classifications and policies move with the data.

Users can be provided with the ability to tag and classify data using custom tags. Any given object stored in the resource provider environment 106 can have one or more custom tags, which can be managed by a data manager 218 and determined using a policy import/export engine or other such component(s). In various embodiments, data object tags can be of two types: mutable and immutable. Mutable tags can be changed at any time during the lifecycle of a data object, with access being controlled (i.e., only federated identities or other authorized identities can have access to edit or change a tag). Immutable tags cannot be removed from a data object or changed once applied to a data object. Object tag access is controlled by the data manager 218, and similar components in other environments, such that only authorized users or groups can edit tags. The ability to enable users to tag and classify data is important in at least some embodiments as it can be impossible, or at least difficult, for the resource provider to attempt to predict the different ways customers would want to author data management policies.

In order to provide the necessary flexibility for users, management policies can be able to be specified for individual data objects. In the example of data on a file system, users manage permissions and metadata on individual files. Managing individual files, however, becomes increasingly difficult as the number of files grows. Similarly, users may can be provided with the ability to write data management policies based on the data classifications (tags) specified at the object level. Such ability enables users to exercise more control and better manage their data in the resource provider environment 106, as may simplify data management. An example includes the writing of a cross-region replication policy based on a custom tag for sensitive user data. However, having policies on custom object level tags may not be sufficient in at least some embodiments. In order to provide a truly customizable policy engine 220, the provider environment 106 can, in at least some embodiments, also support the incorporation of predicate-based triggers. These triggers can include actions such as GET, PUT, and DELETE, for example, that a user can perform on a specified data object. The ability to pivot data management policies on predicates enables customers to write much more effective policies to control on their data. The policy engine 220 can combine object-level custom tags, custom polices, and predicate-based triggers to enable policy-driven data management. Example policies could specify to "only allow GET operations on objects tagged with 'legal hold' if the user accessing the data object is part of a specified group," for example, or "for objects tagged with 'EU' only allow writing to buckets within EU regions," among other such options.

Tags can also be used to track information across the lifecycle of a data object. If a data object is copied and/or moved to a specified location, information such as the classification, applied tags, and the respective policies for that data object need to move with the data object. Keeping this information together with the data object ensures that information can be tracked across the lifecycle even when data moves across trust boundaries 204, 216. For example, an object can be moved to the resource provider environment 106, then copied to a different bucket after applying some transform by creating a secondary data object. The category (i.e., tag) for this data object will need to be copied as well as the policy, even though the second data object may be a copy. Such requirements enable customers to follow the information across its lifecycle and ensure that the appropriate policies are applied. The editing or removal of a policy can be performed only by a user who has explicit permission to edit object policy, and this change can be logged appropriately.

The policy import/export engine 220 can provide access control to manage permissions for the adding, editing, and removal of tags and policies for data object stored in the data stores 116 of the resource provider environment 106. The engine in at least some embodiments can ensure that only authorized users have the ability to change policies on a data object, and that any changes are documented and/or logged for future reference. Various embodiments can also attempt to simplify the creation and management of policy, as users may need the ability to control policies at the object level, but creating a separate policy for every single object will generally not be a manageable solution in at least most circumstances. Instead, the ability to combine a predicate with a tag can enable users to create policies and apply them to specific data objects.

As the data moves across the trusted boundaries 204, 216 from the on-premises storage devices 210 of the user environment 202 to the data storage resources 116 of the resource provider environment 106, the users will need a way to transfer the applicable data categorizations and policies as well. An approach in accordance with various embodiments can utilize a policy migration service, or other such system, service, or component, to enforce existing policies by the resources 114 of the resource provider environment to ensure compliance, security, and IT governance, among other such aspects. Such a service can also ensure polices move with data as the data object(s) moves outside of the resource provider environment. While the functionality will be described as being provided, at least in part, by the policy import/export engine 220, it should be understood that alternative components can be used to provide such a service, as may be part of, or separate from, the resource provider environment. With hybrid storage deployments, users (or customers of the resource provider) may freely move their data between the on-premises storage devices 210 and the data stores 116 of the resource provider environment 106. As users use policies to manage and curate their data on-premises, these policies need to move with the data to the cloud or other such environments. The same restriction applies as data is moved across buckets and otherwise within the resource provider environment 106. The policy import/export engine 220 enables customers to specify the existing policies along with a data object as the data object moves across trusted boundaries 204, 216 to the cloud. This also applies to data moving out of the resource provider environment 106, where the policies that apply to the data object again need to move with the object. Additionally, the resource provider environment 106 can ensure that the policy being specified by the user is secure and has not been improperly modified. Such functionality provides at least some protection against 'man in the middle attacks,' as well as a way for the user to trust the policy after the policy has been provided to the resource provider environment 106. An example would be to 'sign' the policy and later validate the signature to ensure the proper policy has been applied to the object. In order to enable policies to be specified and imported into various embodiments, it is desirable in at least some embodiments to standardize the tags, policies, and classifications, or at least ensure that the format for specifying the policy for a given object is easy to specify and publically documented. Furthermore, the resource provider environment 106 should be configured to be able to handle situations where the policy specified with an object cannot be applied, and place a hold on that data or perform another appropriate action.

In addition to policy migration, in at least some embodiments the chain of custody of the data object is migrated with data as well. The chain of custody in some embodiments includes a detailed audit log/trail of actions performed on the data, as well as tags and policies that govern how the data is managed on the storage platform. The resource provider environment can thus provide a way to import and export the chain of custody along with the policies that apply to the data. Most compliance mandates, such as payment card industry (PCI) and health insurance portability and accountability act (HIPPA) mandates, require enterprises to maintain immutable logs of all actions performed on sensitive data for long periods of time. The detailed audit log of all actions, policies, tags, and interactions forming the 'chain of custody' for a data object can help to track the information lifecycle for the object. According to one International Data Corporation (IDC) study, it is not uncommon to see three to twenty or more copies of production data for backup cycles, business continuance, development test, and data mining. Considering an object that is moved to the resource provider environment 106 in bucket 'A' from an on-premises storage device 210 of the user environment 202, that data object can be copied to a secondary bucket 'B' in the resource environment 106, and the policies on the data object can be edited. In order to maintain the 'chain of custody' for this data object, a detailed log of all actions on the object as well as the policies that govern the object need to be maintained. Looking at the data object in bucket 'B', an auditor should be able to track all actions performed on the object in the on-premises storage appliance, in bucket 'A,' as well as bucket 'B'. These actions include changes to the tags and policies applied to the data.

In addition to ensuring that the relevant policy migrates with a data object as the data object moves to the cloud, the resource provider environment 106 can also ensure that the chain of custody migrates with the data as well. A data object may live on an on-premises storage device 210 for years. The audit log and history of all actions performed on the data object and its policies can be lost as this data moves to the resource provider environment 106. The resources 114 of the resource provider environment thus need to provide users with a way to securely import the audit log and history for the data, in order to maintain the chain of custody for the data. This process also applies for moving a data object out of the resource provider environment. The resource provider environment can provide users a way to obtain the policies, as well as the audit logs, in a standardized format. As the chain of custody is handed over to the resource provider environment from trusted partners, the resource provider environment 106 should be able to validate that the chain of custody is secure and has not been tampered with.

Figure 3:
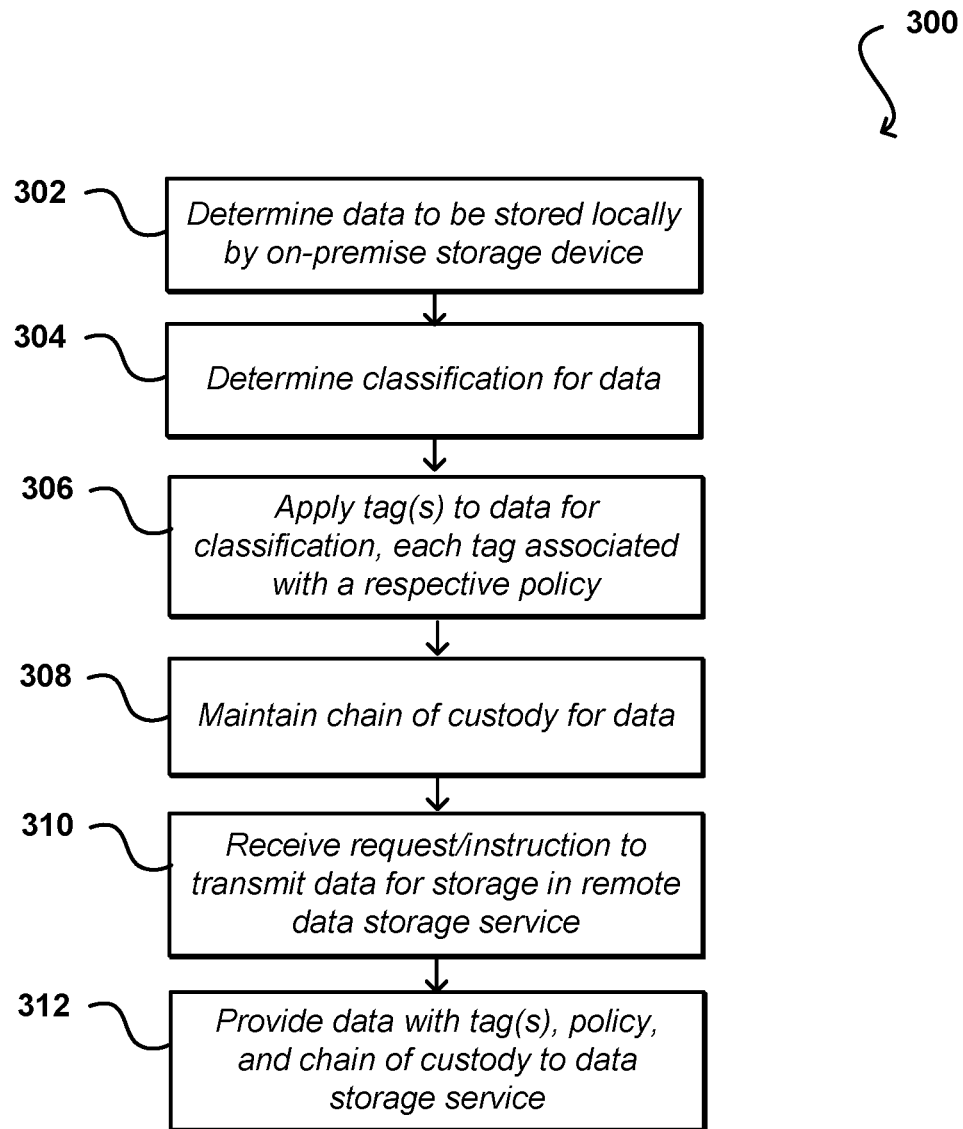
FIG. 3 illustrates a first portion of an example process for applying policies to a data object that can be utilized in accordance with various embodiments.

FIG. 3 illustrates a first portion 300 of an example process for causing a policy to be maintained with a data object that can be utilized in accordance with various embodiments. It should be understood that for this and other processes discussed herein that additional, fewer, or alternative steps can be performed in similar or alternative steps, or in parallel, within the scope of the various embodiments unless otherwise stated. In this example, in which the portion occurs in a user or customer environment, data to be stored locally by an on-premises storage device is determined 302. This can be a manual determination or automatic determination, as may be determined by an application executing in the user environment. A classification for the data can also be determined 304. The classification can be determined automatically or based upon predicates for the data, such as may be based in part upon the filename, date, or other metadata, that is applied to the data object (or policies) during storage and/or transmission of the data, among other such options. The predicate can be defined as one or more actions that can be taken on a data object, such as a READ, WRITE, PUT, or GET, among other such actions. Based at least in part upon the classification of the data, one or more tags can be applied 306 to the data. Each tag can function as an identifier that points to, is indicated by, or is otherwise associated with a policy that governs who should have access to the data, where and how access should be granted, what type of access should be granted, how the data can be used, and/or other such actions. Each policy can be written using a standardized policy language (or otherwise standardized), for example, that can be understood by various environments or services receiving the policy. The policy can then be associated with the data, either through an associated maintained in the user environment or by inserting the policy into the data object with the tag, among other such options. In some embodiments a policy server can be contacted using the information from the tag to determine the appropriate policy, which can then be obtained from a central policy repository or other such location. As the data is stored locally, chain of custody data can be maintained 308 for the data. The chain of custody can include records for any changes related to the data, such as a change in tag, policy, or classification, access to the data, movement of the data, etc. The ability to support such determinations can be performed natively in the user environment, as well as other environments, such that once the data is classified the data can be handled appropriately, and automatically, without user intervention.

A request (or instruction) to transmit the data for storage by a remote data storage service (or other resource provider environment) can be received 310. This can be from within, or from outside, the user environment. If received from outside the environment, an authorization or other such procedure may be performed before initiating the transfer. If it is determined that the data can be transferred for storage, the data can be provided 312 along with the corresponding tag, policy, and chain of custody. Other information such as classification and predicates can also be provided in some embodiments. This information can be embedded in the data object in some embodiments, while in other embodiments the data object may be transferred in a wrapper or "envelope" that includes the policy and chain of custody, with the tag being included in a header of the data object or other such location. In some embodiments the policy may not be included, with the recipient either already having a copy of the standardized policy or being able to request a copy if not already stored. In any case, the data object should be configured such that the policy moves with the data object, in at least some embodiments, such that the policy does not get "lost" as the data is moved or stored in various locations. Further, the chain of custody or audit log should remain with the data object as well. As long as the entity storing the data is trusted, the chain of custody and policy should ensure the integrity and proper use of the data, to the extent practical in such a system. Once the data is transferred to another party the ability to enforce the policy on that party can be limited as discussed elsewhere herein.

Figure 4:
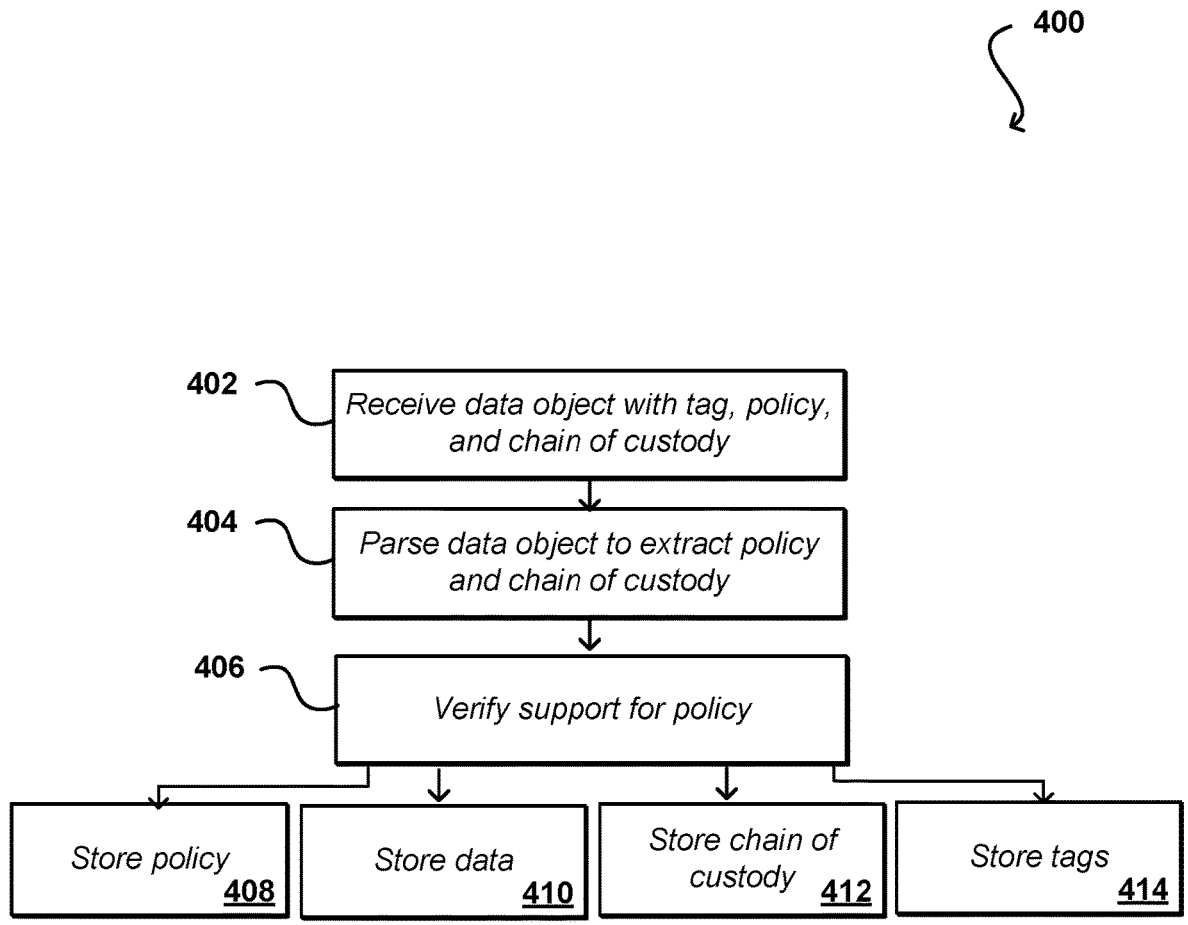
FIG. 4 illustrates a first portion of an example process for applying policies to a data object that can be utilized in accordance with various embodiments.

FIG. 4 illustrates a second portion 400 of the example process that can be performed in accordance with various embodiments. In this portion, which is performed by a data storage service or resource provider environment, for example, a data object is received 402 that includes the appropriate data, as well as at least a tag, a policy, and a chain of custody. As discussed, portions of this information may be contained in an envelope used to wrap the data object during transmission, and other information may be included as well, such as classification or predicate data, among other such options. The data object can be parsed 404, such as by a policy import/export engine, in order to extract the policy and chain of custody information. Before performing any further action, support for the policy in the environment or service can be verified 406. If the service or environment, or at least a bucket or repository to receive the data, is not able to support or enforce the policy, the data object may not be stored by the environment and an error message or other notification sent to the owner of the data (i.e., in the user environment). This can include ensuring that the policy for the data object does not conflict with any other policy in the resource environment. If there are multiple policies, such as a bucket policy, access control list policy, and a user policy, for example, the data object policy must not conflict with any of those policies. If the policy is supported and any other criteria are met, the policy can be stored 408, the data can be stored 410, the chain of custody data stored 412, and the tag(s) stored 414 in the resource environment. These storing steps are shown in parallel as the information can be stored in the same or different locations, such as where the policy is stored to a policy repository to be managed by a policy enforcement engine or other such component or system. The information can also be stored to a single repository in other embodiments. Where the information is stored separately, the relationships between the various information can be maintained as discussed elsewhere herein.

As mentioned, it can be desirable in at least some embodiments to create a standard for the tagging and creation of policies, with standardized resource characteristics, etc. There may be various levels of compliance or support, where a requestor must have the appropriate level in order to be able to receive or access the data, or perform certain actions with respect to the data. Further, the policies provided might not be a bound on the types of use permitted, but a restriction as to certain prohibited uses. For example, the data might be able to be used for any purpose within a trust boundary except to print a copy of the data or generate a copy of the data. Further, the data might not be able to be copied to any location that does not support the policies. There also can be different policies at different levels. For example, there can be policy at the account level, a different policy at the bucket level, and yet another applicable policy at the data object level. As mentioned, there can be unique policies applied to each object, or policies can apply to various classifications of objects or objects including a similar tag. Further, each object can store its own policy or policies can be maintained in a central policy repository, among other such options.

As mentioned, there can be various triggers for a data object as well. There may be various tags defined for a data object, with each specifying a different policy for a different type of operation. When doing a PUT or GET operation, for example, the requestor can specify a policy and one or more triggers. When storing the data object to a resource provider environment, for example, the triggers can be stored with the tags and policies. While a tag is generally an identifier for a policy (or the target of a policy), a trigger refers to an action that can be taken on a data object. Thus, it can be desirable to store information for various triggers as well, as different tags or policies can apply for different actions. For example, a different set of criteria might apply to be able to store data than to read or modify stored data. These can be different triggers, which can each correspond to a different tag and/or policy. In at least some embodiments, as discussed above, a requestor has to provide some information about the intent for the data, which can determine which trigger (and thus which policy) to apply. If a user intends to read the data then one trigger might apply, while a user wanting to print out a copy of the data might have another trigger apply. There can be standard ways of enabling a user to express what they intend to do with the data, and there can be a standardized way to respond to those requests as well.

In some embodiments, it can be desirable to determine the source of a data object before storing the data object to an environment or performing another such action. In some embodiments a request to PUT an object to a data repository in an environment can be signed, using a digital signature, to ensure the source of the data, as well as the fact that that data likely has not been compromised by a "man in the middle" or other intervening party. Particularly for situations such as audit or compliance determinations, it can be necessary to show that the data was not modified between the sender and the recipient. Various types of authentication can be used to verify the authenticity of a certificate, as well as that the data signed with that certificate was not modified. When a data object with a tag is received, it can thus be determined that the object came from a trusted partner and that the policy can be enforced without concern. Not every aspect of the data object needs to be signed, as long as the tag (and potentially the audit log) is part of the signature in at least some embodiments.

In addition to certain types of access for performing certain types of actions with respect to the data of the object, different types of access can enable different actions to be performed with respect to the data object itself. This can include, for example, the ability to modify or update the tags or policies associated with the data object, specify new triggers, or perform other such actions. As mentioned previously, any such change can be reflected in the audit log or chain of custody. The access control can be specified by a policy in some embodiments, which can reside at a higher level than the use policy for the data object. Different policies at different levels of a level hierarchy can allow different policy criteria and actions to be applied at different levels of the hierarchy, such as at the bucket level, account level, or user level, among other such options.

In certain instances, it is possible that a data object received to, generated in, or stored by an environment may not have any such tags applied. It is also possible that the data object may have one or more tags applied, but that additional or alternative tags should be applied, or removed, from the data object. Further still, the environment currently storing the data object might have specific definitions or rules that determine which tags to apply to the data object, which might be different from the tags applied in another environment, or the tag might at least have to be transformed for the new environment.

Figure 5:
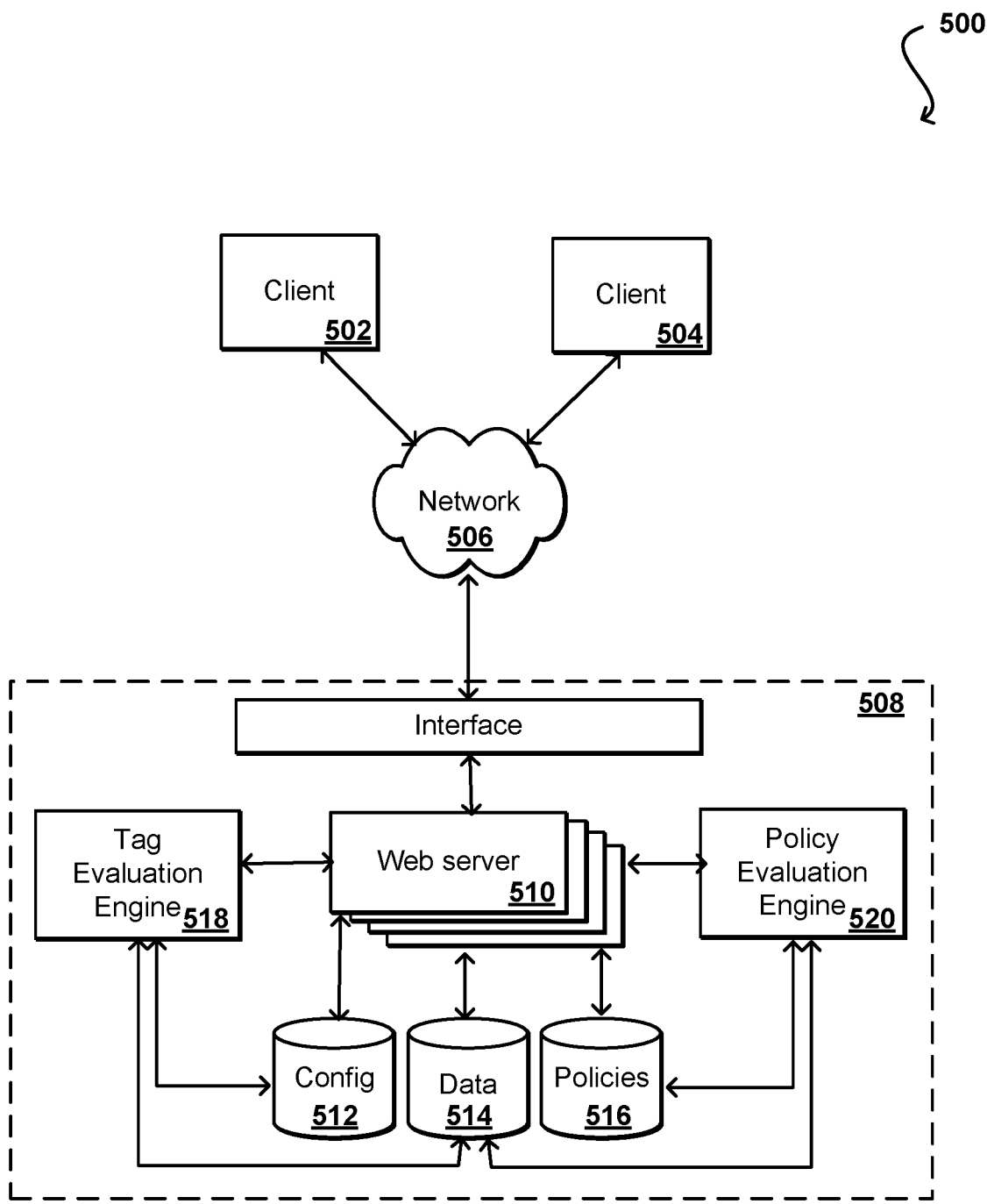
FIG. 5 illustrates an example environment in which tags can be automatically applied to data objects in accordance with various embodiments.

FIG. 5 illustrates an example environment 500 in which such tag management can be performed in accordance with various embodiments. In this example, a first user (or "customer") might have an account with a resource provider, as discussed above, which provides a set of resources as part of a resource provider environment 508. As discussed above, the customer can use a client device 502 to send requests over at least one network 506 to be received by an interface layer of the resource provider environment 508, which can cause information for the request to be directed to the appropriate resource(s) or other systems, services, or components within the environment.

In one example, the customer can generate an auto-tagging configuration file that indicates various rules or criteria for causing one or more tags to be applied to a data object. While a file (i.e., an XML file) is mentioned as an example, it should be understood that the auto-tagging configuration can take various other forms as well, such as a set of rules or group of metadata, among other such options. As mentioned above, a tag can be applied to a data object for various reasons, as may relate to a categorization of the data or other such aspect. In some embodiments, a tag may be applied based at least in part upon one or more aspects of the data object or condition related to the data object, such as a predicate of a data object, a name of a data object, a source of a data object, an application having generated the data object, a geophysical location of the data object or a source of the data object, or an owner of the data object, among other such options. As mentioned elsewhere herein, a string (or other) search can also be performed to cause a tag to be applied to a data object that contains a specified string or other such content. In some embodiments the auto-tagging configuration can be a set of criterion-tag pairs, where a data object can satisfy one or more criteria of the configuration to cause the corresponding one or more tags to be applied.

In this example, the customer can use the client device 502 to submit the auto-tagging configuration to one of a plurality of Web servers 510 of the resource provider environment. While Internet-based technologies and Web servers are used for example purposes, it should be understood that other types of networks, servers, and components can be used as well within the scope of the various embodiments. The Web server 510 can analyze the auto-tagging configuration and, upon approving the auto-tagging configuration in at least some embodiments, cause the auto-tagging configuration to be persistently stored to a configuration data store 512 or other such repository. It should be understood that while separate data stores are discussed herein, different volumes, pages, or other portions of a single data store can be used to provide such data storage within the scope of the various embodiments, and a single data store may span multiple devices in various embodiments. In some embodiments the Web server 510 and/or configuration data store 512 may be associated with, or allocated to, the customer account, while in other embodiments the data store may be a multi-tenant data store that stores (or is configured to store) data for multiple customers.

As mentioned, the Web server 510 may have to do some processing of the auto-tagging configuration before persisting the configuration to the configuration data store 512. This can include, for example, determining any conflicts between the tags or definitions of the configuration with existing tags or definitions in the resource provider environment that may require a transformation within the configuration. The analysis can also involve ensuring that the configuration complies with rules, requirements, or policies of the resource provider environment 508, among other such options. The analysis can also include ensuring that all contents of the configuration are able to be read, interpreted, and enforced within the environment. If not, the configuration can be rejected or at least held in resident memory with a notification being sent to the customer whereby the customer can take appropriate action before the configuration is persisted to the configuration data store 512. It should also be mentioned that the configuration when persisted can be tied to a customer bucket or top level container, among other such options.

The customer can also cause data (including metadata) to be stored to the resource provider environment 508. In this example, the customer can send a set of data objects (together with the configuration or separately) that can be directed to one of the Web servers 510 of the resource provider environment 508. While in many situations the Web server receiving the data will be different than the Web server receiving the configuration due to resource sharing, load balancing, and other such functions, in some embodiments the same Web server or other such resource may be used to process these and other tasks for the customer. The "raw" customer data can then be caused to be persisted to an appropriate data store 514, which in many instances will be separate from the data store containing the auto-tagging configuration file.

In some embodiments, the data objects or raw data will not have any tags applied until a later time, such as when a GET request is received for the data. In this example, however, the data can be automatically tagged as part of a PUT or other process that causes the customer data to be received to and/or stored by the resource provider environment. In this example, the Web server 510 receiving the data can contact a tag evaluation engine 518, or other such system, service, or device, in order to analyze the incoming customer data and determine whether any tags should be applied to the data based at least in part upon the customer configuration. In this example, the Web server 510 can pass information for the received data objects, such as name, predicate, or other metadata, or even the entire objects themselves, to the tag evaluation engine 518. The tag evaluation engine 518 can access the customer configuration from the configuration data store 512 and determine, based on the rules or conditions of the customer auto-tagging configuration, whether any tags should be applied to the data objects. In this example, the tag evaluation engine can analyze the content of each received data object to determine whether the data object satisfies any of the criteria of the configuration, such as by having a predicate or including a string associated with a certain type or category of data. As mentioned, this can include associating a "human_resources" tag with any data received from an address or owner associated with human resource, placing a "legal_hold" tag on any data object containing a specified string of characters, or adding a "product" tag to a data object with a product predicate or key value, among other such example options discussed and suggested herein. The data analyzed can include the metadata about the owner, creator, or source, for example, as well as the raw customer data itself, among other such options. In some embodiments, any data or metadata used to make a tagging decision may have to be persisted with the data object in the appropriate data store. Other data sources can be analyzed as well, such as data logs or account information for a customer.

For each criterion from the auto-tagging configuration that the tag evaluation engine 518 determines to be satisfied by the data object, an appropriate tag can be applied to the data object. The name of the tag to be applied can be included in the auto-tagging configuration, along with the tag conditions and other such information. In some embodiments, the tag evaluation process may also include identifying tags associated with the data object that no longer meet the associated criteria, and removing that tag from the data object. Similarly, the applied tags may need to be updated based upon changes to the data object or auto-tagging configuration, among other such options.

Figure 6:
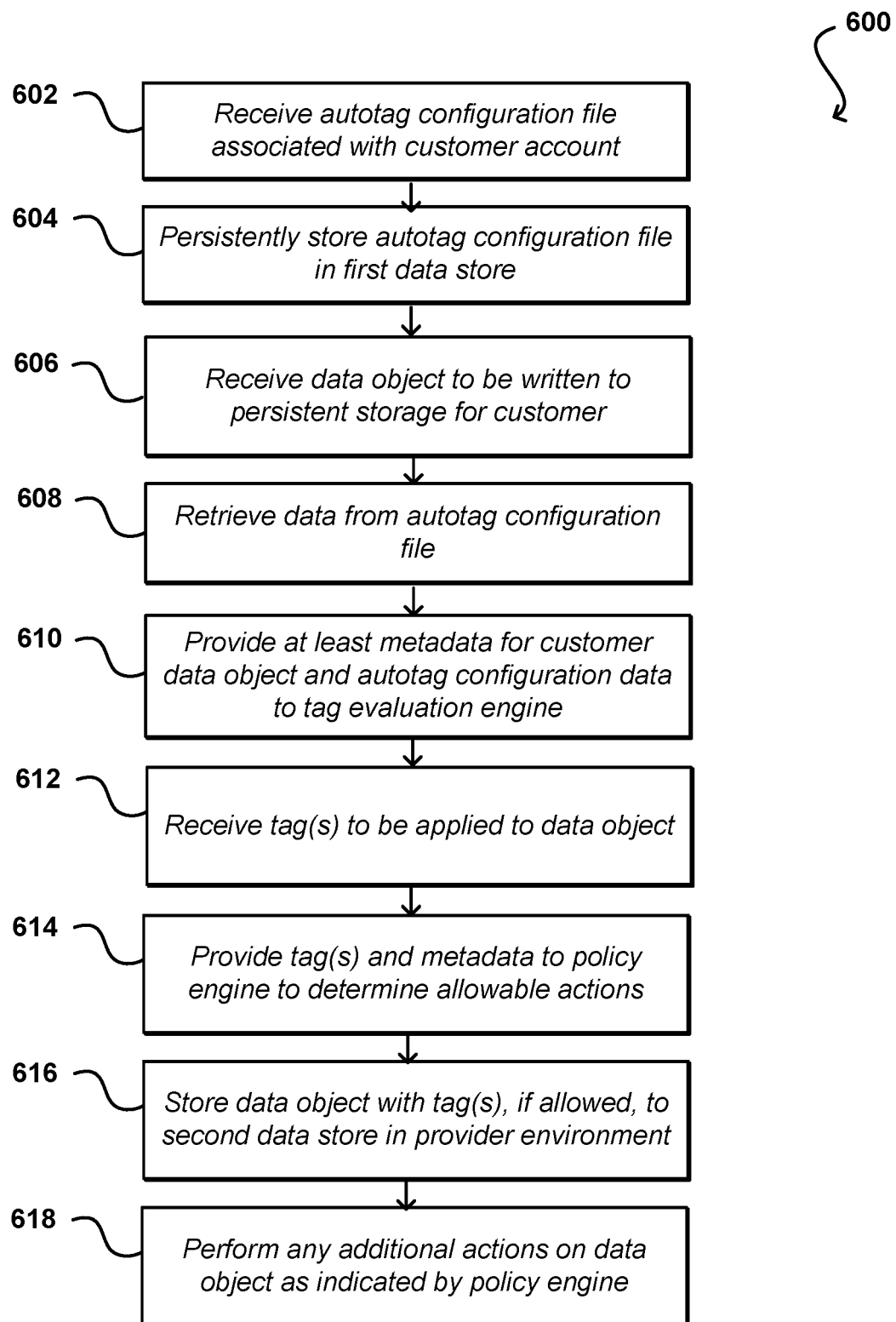
FIG. 6 illustrates an example process for automatically tagging a data object that can be utilized in accordance with various embodiments.

FIG. 6 illustrates an example process 600 for automatically tagging data objects that can be utilized in accordance with various embodiments. In this example, an auto-tagging configuration file is received 602 that is associated with a customer account. As mentioned, the file can be received to a server, Web server, or other such component or system, that is able to cause the auto-tagging configuration file to be persistently stored 604 in the environment, such as to a first data store. A data object associated with the customer account can subsequently be received 606 to the environment, where that data object is also to be written to persistent storage. Upon receiving the data object, the condition data can be retrieved 608 from the auto-tagging configuration file, if not already in memory or otherwise available. At least the metadata, if not a portion of the data or the entire data object, can be provided 610 to a tag evaluation engine, which is able to evaluate the data against the conditions in the auto-tagging configuration file. The result of the tag evaluation can be a set of tags to be applied to specific data objects. The tags can be received 612 or otherwise specified by the tag evaluation engine, and can be applied to the appropriate data object(s) if not already applied by the tag evaluation process. The tags and metadata in at least some embodiments can be provided 614 to a policy evaluation engine in order to determine allowable (or required) actions for the data object, such as whether the data object is allowed to be stored to the intended location. Assuming such storage is permissible, the data object with the associated tags can then be stored 616 to an appropriate repository, such as a second data store in the resource provider environment. Other actions may be performed 618 as well as indicated by the policy evaluation engine, such as to transform or update the data object, or write information to a log, among other such actions discussed and suggested elsewhere herein.

Similar updating or modifying of tags for a data object can occur in response to other actions as well. For example, a data object might be moved from one data store to another, might be accessed by a customer or application, or might be updated, among other such actions. Each of these actions might potentially trigger an evaluation by the tag evaluation engine 518, whereby the resource provider environment 508 can automatically update, apply, or remove tags based upon current customer auto-tagging configuration, as well as any other auto-tagging criteria that may exist and apply within the resource provider environment. Similarly, the receiving of a new auto-tagging configuration, or new data for an existing configuration, may trigger an evaluation process as well within the scope of the various embodiments. In some embodiments such processes can be performed periodically or at other appropriate times (i.e., at specific points in a lifecycle of a data object) in order to attempt to keep the tags as current as possible.

Figure 7:
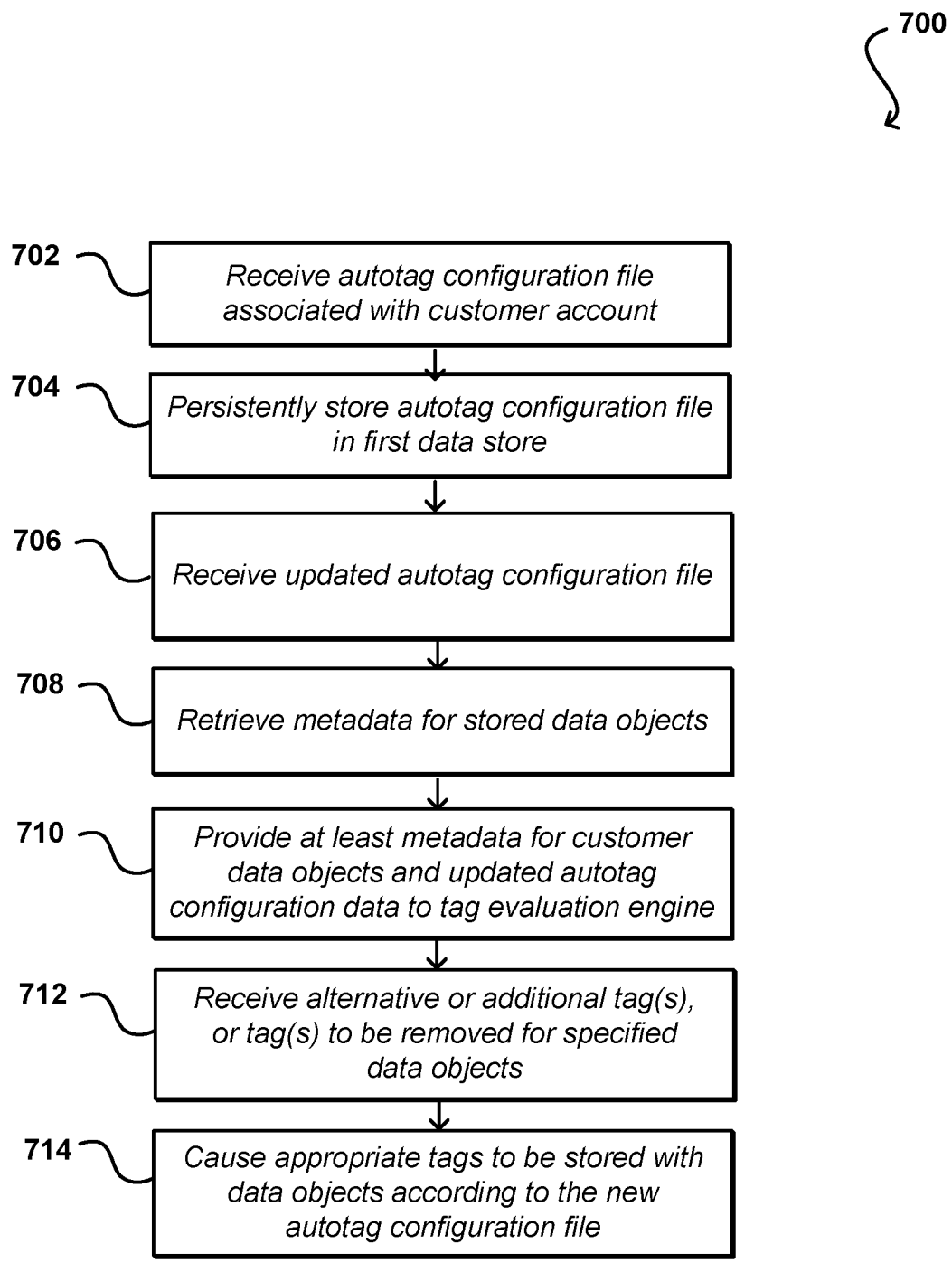
FIG. 7 illustrates an example process for automatically updating one or more tags for a data object that can be utilized in accordance with various embodiments.

For example, FIG. 7 illustrates an example process 700 for applying and/or updating tags that can be utilized in accordance with various embodiments. In this example, an auto-tagging configuration file is received 702 that is associated with a customer account, and caused to be persistently stored 704 in a first data store in the resource provider environment. This may, or may not, cause an automated tagging process to occur, depending at least in part upon whether the customer data was received before the receiving of the auto-tagging configuration file. Subsequently, an updated configuration file can be received 706. This can include a replacement file or data to be amended in the existing file, among other such options. The receiving of new auto-tagging configuration data can trigger an auto-tagging process. In this example, at least the relevant metadata for the stored data objects for a customer can be retrieved 708 and provided 710 with the updated auto-tagging configuration data to a tag evaluation engine, which can evaluate the metadata and/or data for the customer objects against the configuration file for the customer. Any additional or alternative tags to be applied to the data objects can be received 712 or otherwise specified by the tag evaluation engine, or other such system, service, or device. The tag evaluation engine can also specify tags that should no longer be associated with the data objects. The appropriate data tags can then be caused 714 to be stored with the corresponding data objects according to the new auto-tagging configuration file and/or data. In some embodiments any update to the auto-tagging configuration can trigger an auto-tagging process, while in other embodiments only specific changes or other variations can trigger such a tagging process. The trigger in some embodiments can be specified by the customer or resource provider, among other such options. As with other processes discussed herein, the updating of the tags can also trigger a policy evaluation in order to determine whether any actions are to be performed for the data object, as well as to ensure that current usage or storage of the data object still complies with the appropriate policies. If any actions are determined that are to be performed, those actions can be performed to the extent possible and/or permissible within the system. If any actions are unable to be performed, a notification may be sent to the owner of the data object or a system administrator, the data object may be placed on a temporary access hold, or another appropriate remedial action can be taken.

In some embodiments, an attempt to conserve resources might result in an auto-tagging procedure only being executed as needed. For example, putting data into a system does not require that the data be tagged in at least some embodiments, unless that tagging affects how the data is stored, etc. It is the access or use of that data that may require the data to be tagged in some embodiments in order to ensure that proper access and/or use of that data is enforced. In some embodiments, the access or use of data might trigger an additional or supplemental auto-tagging process to ensure that the tags on a data object comply with the current auto-tagging configuration for the associated customer. Other reasons exist that may warrant an additional auto-tagging analysis upon a request to access stored data for a customer.

Returning to the environment 500 of FIG. 5, the data objects and policies can be stored in the respective data stores 514, 516 as discussed previously. Subsequently, a request can be received from the customer through the first client device 502 or another user through a second client device 504, for example, that requires access to one or more stored data objects. This can include a GET request to obtain a copy of the data, or another request that involves access and/or use of the data object(s). In some embodiments, the process can involve analyzing the tags on certain data objects and passing the tag data through a policy evaluation engine 520 to determine actions to be taken for that data based at least in part upon the applied tag(s). In at least some embodiments, an auto-tag determination process can be launched that can cause the tags for the data objects to be evaluated to ensure that they are accurate according to the current auto-tagging configuration.

Once the tags for the requested data objects are determined, the tags can be compared against the appropriate policies to determine actions to be taken, or permitted to be taken, for the data objects based at least in part upon those tags. In some embodiments, the customer can provide a set of policies that can be received to one of the Web servers 510 and then stored to a policy data store 516 (or other appropriate location). As with the tags, the Web server can first evaluate the policies in some embodiments to ensure that the policies do not conflict with other policies and/or comply with rules or requirements for the provider environment, etc. When a request for access to a data object is received, a policy evaluation engine 520, which can be the same as, or separate from, the tag evaluation engine 518 in some embodiments, can retrieve the appropriate policies from the data store for use in evaluating the request and the tags for the corresponding data objects. This can include, for example, determining types of actions that are allowed to be performed for a data object with a specific type of tag and determining whether that action enables the request to be performed. This can include an "action policy" such as an authorization policy, bucket policy, and the like. For example, if the tag is a "legal_hold" tag that a corresponding policy prevents the data from being accessed, then the request can be denied. If the tag indicates a type of data that a policy indicates must be retained for 30 days, and the request involves deleting the data object, then the policy would only allow the delete action if the data object had already been retained for 30 days. Various other such policies and actions can be utilized as well within the scope of the various embodiments as would be apparent to one of ordinary skill in the art in light of the teaching and suggestions contained herein. In some embodiments a tag can be, or include, a pointer to a specific policy, and multiple policies might apply to a single data object. The policies can specify several different actions that are permitted to be, or prevented from being, performed for a given data object. As with tags, policies can be re-evaluated periodically or at certain lifecycle events, such as at expiration to delete data, upon a movement of data, upon a transformation or transcoding, upon compression or updating, upon changing of metadata, etc.

Figure 8A:
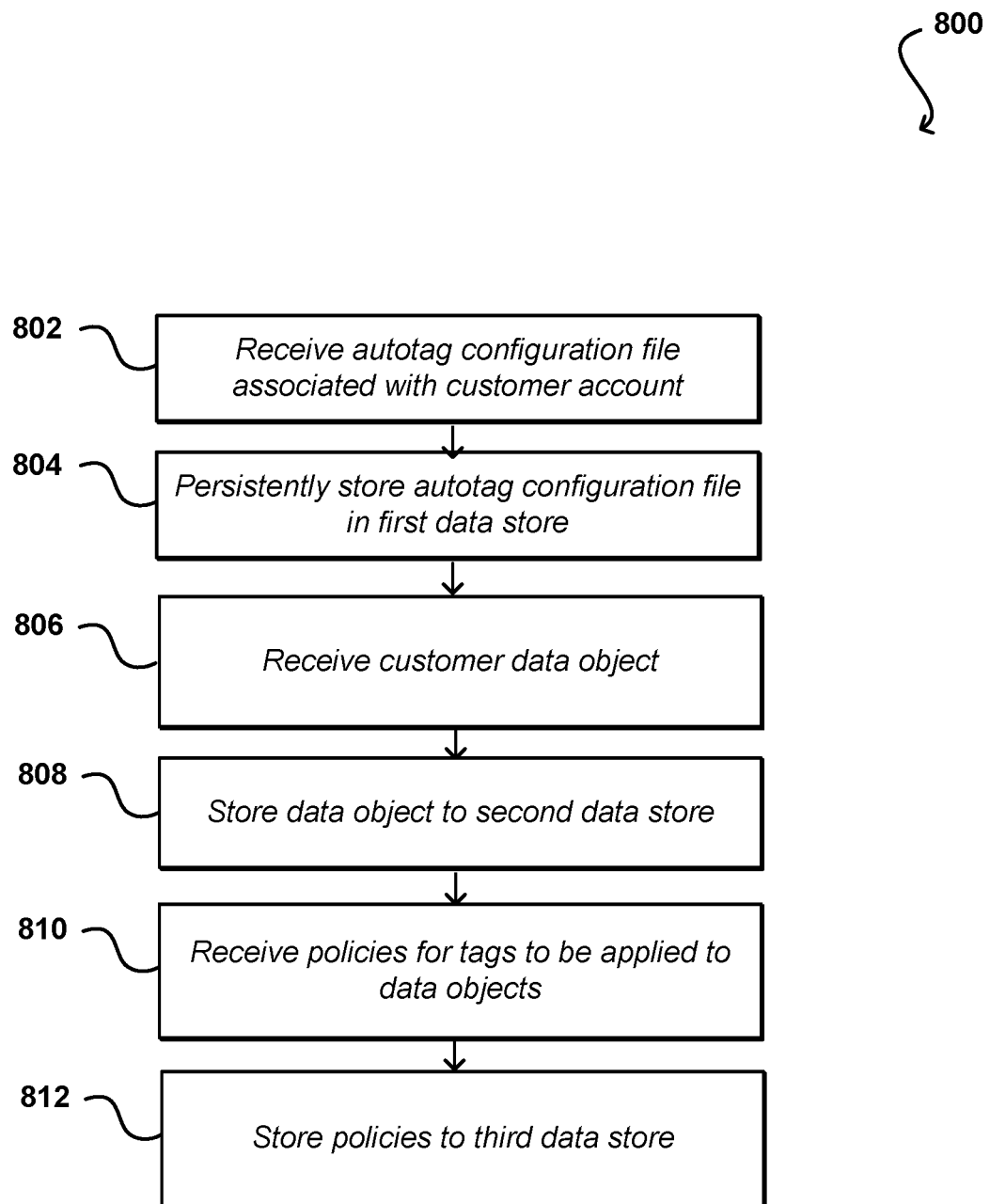
FIG. 8A illustrates a first portion of an example process for causing one or more tags and policies to be applied to a data object that can be utilized in accordance with various embodiments.

FIG. 8A illustrates a first portion 800 of an example process for performing auto-tagging as part of a data access operation that can be utilized in accordance with various embodiments. In this example, an auto-tagging configuration file is received 802 that is associated with a customer account. The configuration file can be analyzed, as discussed previously, and caused to be persistently stored 804 in a first data store in the resource provider environment. At least one customer data object can also be received 806, that can be persistently stored 808 to a second data store. As mentioned, the data object could have been tagged when received, instructed to be tagged as part of a PUT request, or tagged as part of an auto-tagging process in some embodiments, while the data object may not have any tags applied upon storage in other embodiments. One or more policies can be received 810 that are to be applied in order to enforce specific actions for the data objects based at least in part upon the applied tags, with those policies being stored applied to a third data store 812. In some embodiments two or more of the policies, tags, and data objects can be stored to the same data store, while in other embodiments more than three data stores may be used, among other such options.

Figure 8B:
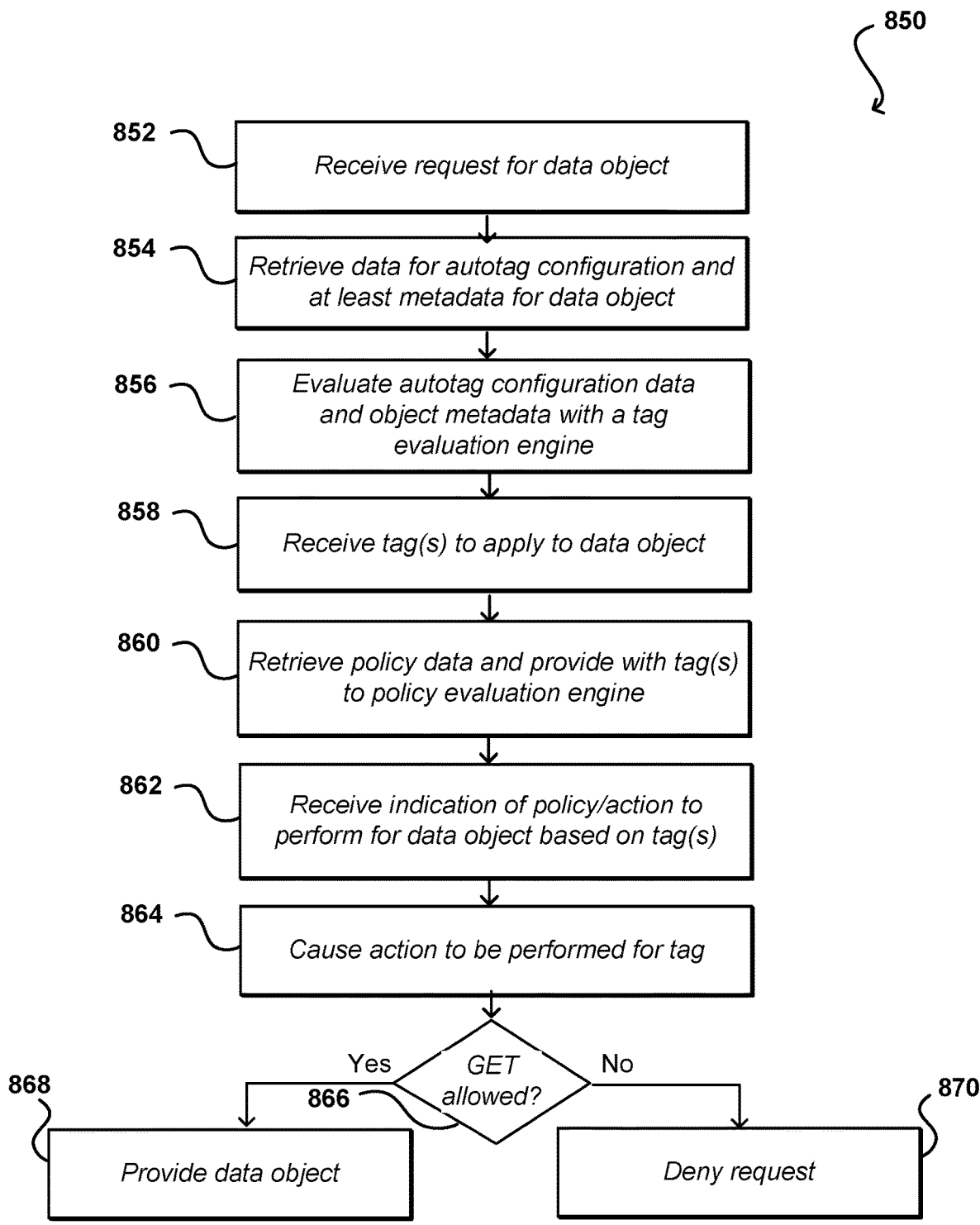
FIG. 8B illustrates a second portion of an example process for causing one or more tags and policies to be applied to a data object that can be utilized in accordance with various embodiments.

FIG. 8B illustrates a second portion 850 of the example process that can be utilized in accordance with various embodiments. In this example, a request for a data object is received 852. This can be a GET request in some embodiments, while in other embodiments this can involve a request to access, modify, or perform a specified action with respect to at least one data object. In response to the request, the data for the auto-tagging configuration file can be retrieved 854, along with at least the metadata for the data objects associated with the request. The auto-tagging configuration data can be used by a tag evaluation engine or other such system or service to evaluate 856 the configuration data and data object(s) to determine whether any tags are to be applied, updated, or removed from the data object(s). Any received tag(s) to be applied to the data object(s) can be received 858 or otherwise specified by the tag evaluation engine.

Once the tags are applied and current, policy data can be retrieved 860 and provided with the tag(s) for the data object(s) to a policy evaluation engine. As discussed, this may involve an authorization engine for evaluating one or more authorization policies as well as an action policy evaluation engine for evaluating one or more other action policies that apply to the data object(s). As a result of the evaluation, an indication of one or more actions to be performed (or allowed to be performed) can be received 862, as well as indication of any actions not allowed to be performed, etc. This can include, for example, denying access, encrypting the data, sending a message, generating a log entry, or performing another such action. The Web server, or other appropriate system or service, can cause 864 the appropriate action to be performed as necessary for the request. The Web server can attempt to resolve any conflicts, such as by evaluating a weight or priority to the various actions, etc. If the GET or other access request is determined to be allowed 866 according to the actions, or after one or more specific actions are taken, etc., then the data object (or at least access to the object) can be provided 868 as appropriate. If not, the request can be denied 870 or another appropriate action taken.

Figure 8C:
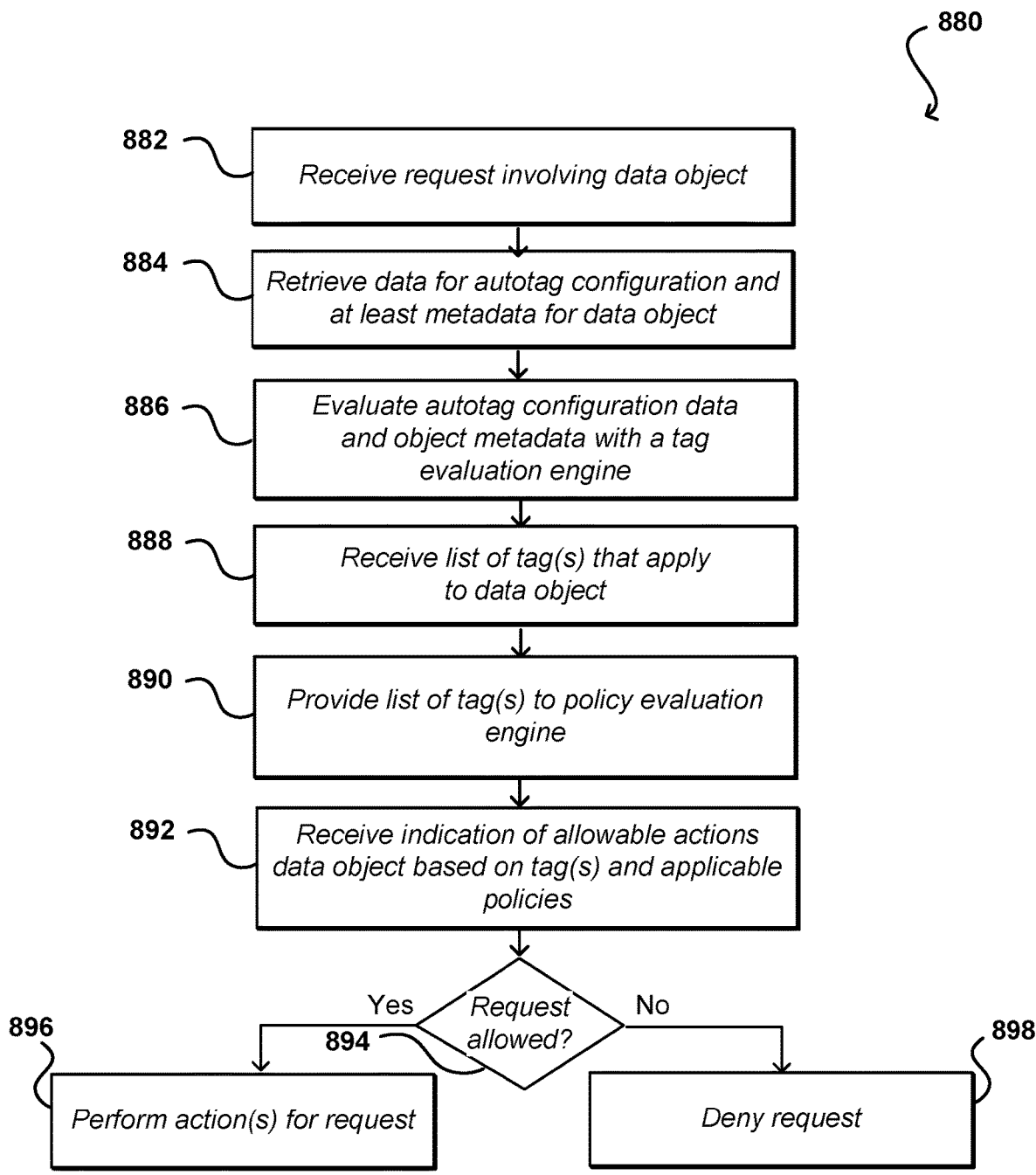
FIG. 8C illustrates a third portion of an example process for causing actions to be performed on a data object based on applied tags and policies that can be utilized in accordance with various embodiments.

FIG. 8C illustrates a third portion 880 of the example process that can be utilized in accordance with various embodiments. In this example, a request is received 882 that involves a potential action to be taken with respect to a data object. Instead of a read or access request from a user, however, this request can be from an internal system component or application, for example, to perform an action with respect to the data object. This can include any appropriate action that may be due to a system change, application update, data object lifecycle, change in policy or configuration, or other such trigger. For example, a data object might have a determined lifetime or period when the data object is to have restricted access, and the action might involve deleting the data object or changing a security level of the data object. It can also include transforming or transcoding the data object, among other such actions. As with the earlier process, the data for the auto-tagging configuration file can be retrieved 884, along with at least the metadata for the data objects associated with the request. The auto-tagging configuration data can be used by a tag evaluation engine or other such system or service to evaluate 886 the configuration data and data object(s) to determine whether any tags are to be applied, updated, or removed from the data object(s). A list of current tag(s) for the data object(s) can be received 888 or otherwise specified by the tag evaluation engine. This can include currently applied tags and tags to be applied, and can omit tags that are currently applied but should be removed, among other such options.

The list of tag(s) (before, during, or after application to the data object(s)) can be provided 890 to the policy evaluation engine. As discussed, this may involve an authorization engine for evaluating one or more authorization policies as well as an action policy evaluation engine for evaluating one or more other action policies that apply to the data object(s). As a result of the evaluation, an indication of one or more actions permissible to be performed (or indicated to be performed) can be received 892, as well as indication of any actions not allowed to be performed, etc. This can include, for example, denying access, encrypting the data, sending a message, generating a log entry, or performing another such action. The Web server, or other appropriate system or service, can determine 894 whether the action(s) for the request are permissible, and if so can cause 896 the appropriate action(s) to be performed for the request. The Web server can attempt to resolve any conflicts, such as by evaluating a weight or priority to the various actions, etc. The Web server can also cause any other actions to be performed per the policies, such as where a change in security setting requires another action to be taken, such as to adjust a tag, change permissions, move to a different storage location, etc. If the action(s) for the request are not permissible, or cannot otherwise be performed, the request can be denied 898 or another appropriate action taken.

Figure 9:
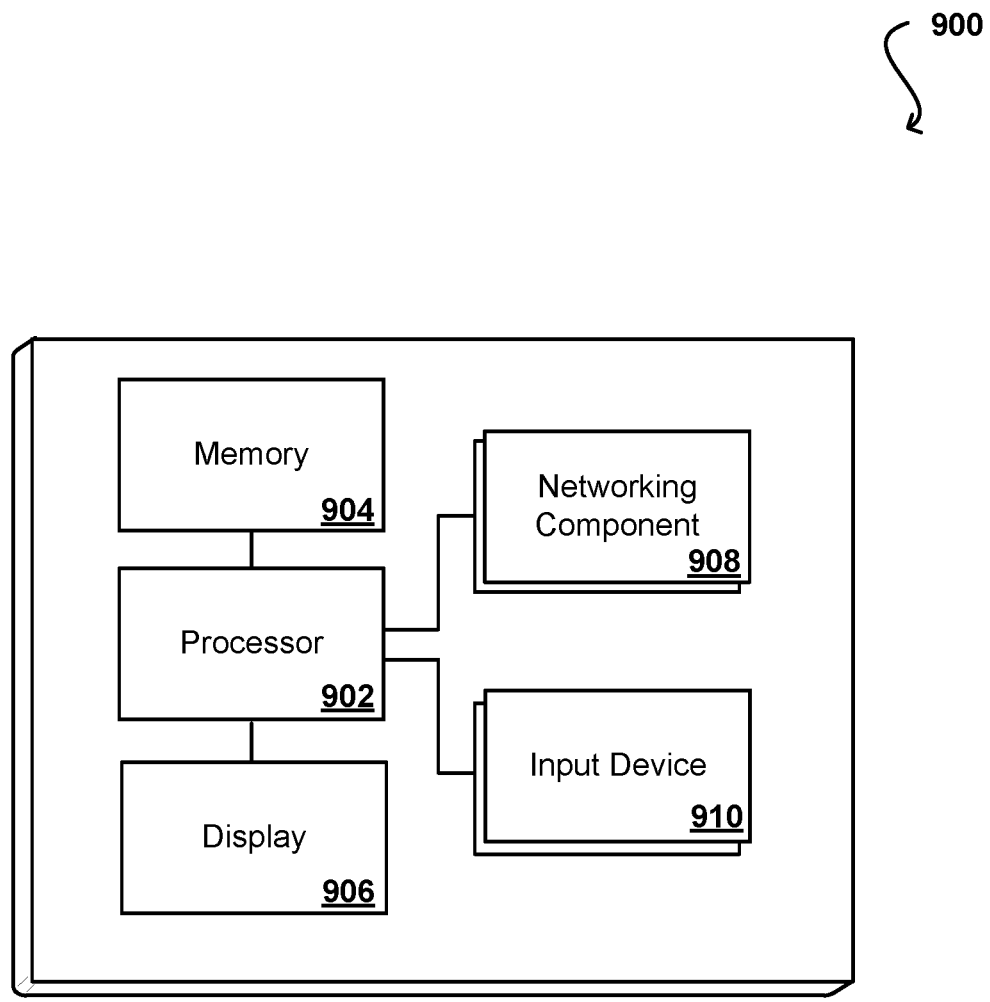
FIG. 9 illustrates example components of a computing device that can be used to implement aspects of various embodiments.

FIG. 9 illustrates a set of basic components of an example computing device 900 that can be utilized to implement aspects of the various embodiments. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device may include at least one type of display element 906, such as a touch screen, electronic ink (e-ink), organic light emitting diode (OLED) or liquid crystal display (LCD), although devices such as servers might convey information via other means, such as through a system of lights and data transmissions. The device typically will include one or more networking components 908, such as a port, network interface card, or wireless transceiver that enables communication over at least one network. The device can include at least one input device 910 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a request to transfer a data object from a local storage to a resource provider environment, the data object associated with at least one local tag comprising an indication of one or more actions permissible in the local storage for the data object;
   receiving, to the resource provider environment, a tag configuration file associated with a customer of the resource provider environment, the tag configuration file including criteria for applying tags to data objects;
   storing the tag configuration file to persistent storage in the resource provider environment;

receiving, to the resource provider environment, the data object;
retrieving the criteria from the tag configuration file;
evaluating, using a tag evaluation engine, at least metadata for the data object against the criteria from the tag configuration file;
determining at least one tag, associated with the at least one local tag, to be applied to the data object;
automatically applying the at least one tag to the data object;
evaluating, using a policy evaluation engine, the at least one tag automatically applied to the object; and
storing, to permissible storage upon determination that the storage is permissible per the policy evaluation engine, the data object with the at least one tag, the at least one tag providing at least a data classification for the data object.

2. The computer-implemented method of claim 1, further comprising:
determining the metadata for the data object, the metadata including at least one of a source of the data object, an owner of the data object, a geophysical location of the data object, a name of the data object, an application having generated the data object, or a predicate of the data object.

3. The computer-implemented method of claim 1, further comprising:
searching the customer data of the data object for a specified aspect of the data object, wherein a specified criterion of the criteria of the tag configuration file causes a respective tag to be applied to the data object in response to the specified aspect being located in the customer data of the data object.

4. The computer-implemented method of claim 1, further comprising:
detecting a change to the tag configuration file associated with the customer; and
automatically re-evaluating, using the tag evaluation engine, at least the metadata for the data object against the criteria from the tag configuration file after the change.

5. The computer-implemented method of claim 1, further comprising:
determining, per the policy evaluation engine, at least one specified action to be performed with respect to the data object for the at least one tag; and
performing the at least one specified action.

6. A computer-implemented method, comprising:
receiving a request to transfer a data object from a local storage to a multi-tenant environment, the data object associated with at least one local tag comprising an indication of one or more actions permissible in the local storage for the data object;
receiving, to the multi-tenant environment, the data object;
retrieving criteria for applying tags to data objects in the multi-tenant environment;
evaluating, using at least one computing resource of the multi-tenant environment, the data object against the criteria;
determining at least one tag, associated with the at least one local tag, to be applied to the data object in the multi-tenant environment;
automatically applying the at least one tag to the data object; and
storing the data object, with the at least one tag, to persistent storage in the electronic environment.

7. The computer-implemented method of claim 6, further comprising:
receiving the criteria as part of a tag configuration file associated with the user; and
persistently storing the tag configuration file in the multi-tenant environment.

8. The computer-implemented method of claim 6, further comprising:
analyzing the tag configuration file in the multi-tenant environment; and
transforming one or more criteria of the tag configuration file to enable the one or more criteria to be enforced in the multi-tenant environment.

9. The computer-implemented method of claim 6, further comprising:
detecting a change with respect to the data object in the multi-tenant environment; and
automatically re-evaluating the data object against the criteria from the tag configuration file.

10. The computer-implemented method of claim 9, wherein the change includes at least one of an expiration, a movement, a transformation, a transcoding, a compression, or a modification of data or metadata for the data object.

11. The computer-implemented method of claim 6, further comprising:
detecting a change with respect to the criteria for applying the tags to the data objects; and
automatically re-evaluating the data object against the criteria after the change.

12. The computer-implemented method of claim 6, wherein the at least one tag indicates one or more policies to be enforced upon a request for access of the data object.

13. The computer-implemented method of claim 6, further comprising:
determining metadata for the data object for evaluation using the criteria, the metadata including at least one of a source of the data object, an owner of the data object, an application having generated the data object, or a predicate of the data object.

14. The computer-implemented method of claim 6, further comprising:
searching user data of the data object for a specified character string, wherein a specified criterion of the criteria causes a respective tag to be applied to the data object in response to the specified character string being located in the user data of the data object.

15. A system, comprising
at least one processor; and
memory including instructions that, when executed by the at least one processor, cause the system to:
receive a request to transfer a data object from a local storage to a multi-tenant environment, the data object associated with at least one local tag comprising an indication of one or more actions permissible in the local storage for the data object;
receive the data object in the multi-tenant environment;
retrieve user-supplied criteria for applying tags to data objects;
evaluate the data object against the criteria;
determine at least one tag, associated with the at least one local tag, to be applied to the data object;
automatically apply the at least one tag to the data object;
determine, based at least in part upon one or more policies corresponding to the at least one tag, one or more permissible actions for the data object; and store the data object, with the at least one tag, to persistent storage in response to storing the data object to the persistent storage being permissible per the one or more policies.

16. The system of claim 15, wherein the instructions when executed further cause the system to:
receive the criteria as part of a tag configuration file associated with the user; and
persistently store the tag configuration file.

17. The system of claim 15, wherein the instructions when executed further cause the system to:
detect a change with respect to the data object; and
automatically re-evaluate the data object against the criteria from the tag configuration file.

18. The system of claim 15, wherein the instructions when executed further cause the system to:
detect a change with respect to the criteria for applying the tags to the data objects; and
automatically re-evaluate the data object against the criteria after the change.

19. The system of claim 15, wherein the instructions when executed further cause the system to:
perform an additional action on the data object based at least in part upon the one or more policies corresponding to the at least one tag.

20. The system of claim 15, wherein the instructions when executed further cause the system to:
periodically re-evaluate the data object against the criteria.

\* \* \* \* \*